No. 760,783. Patented May 24, 1904.

UNITED STATES PATENT OFFICE.

CARLETON ELLIS, OF BOSTON, MASSACHUSETTS, ASSIGNOR TO NATHANIEL L. FOSTER, TRUSTEE, OF BROOKLINE, MASSACHUSETTS.

FLUX FOR SOLDERING ALUMINIUM.

SPECIFICATION forming part of Letters Patent No. 760,783, dated May 24, 1904.

Application filed January 12, 1904. Serial No. 188,736. (No specimens.)

*To all whom it may concern:*

Be it known that I, CARLETON ELLIS, of Boston, in the county of Suffolk and State of Massachusetts, have invented certain new and useful Improvements in Flux for Soldering Aluminium, of which the following is a specification.

The object of this invention is to provide a flux for soldering aluminium which shall overcome the repellent action of the aluminium and permit the solder to flow readily over the surface. In United States Patent No. 746,802, of December 15, 1903, issued to Carleton Ellis and Owen J. Flanigan, the patentees describe the thermoplating action of the salts of the heavy metals when used in combination with organic bodies as a flux for soldering aluminium or beryllium.

The present invention is an improvement on the above-cited patent; and it consists in the use, with the heavy metal salts and organic matter, of various salts or compounds having a cleansing or fluxing action on the aluminium surface and which thereby assist in removing the alumina and in aiding the action of thermoplating. A large number of compounds act more or less efficiently in this manner. Chief among these are the haloid salts of the alkalies or alkaline earths—as, for example, potassium fluorid or barium bromid. From ten to fifty per cent. of these salts, calculated on the weight of the heavy metallic salt used, may be taken in preparing the flux. The quantity to be used is not necessarily limited to these proportions. Larger or smaller amounts may be used, if desired.

As an example of a suitable composition for a flux, mix ten parts silver bromid, nine parts sodium fluorid, twenty-five parts melted wax. Stir the mixture until the solidifying-point is nearly reached, when the plastic mass may be pressed into the form of sticks or pencils. If the mixture is to be applied in paste form, a volatile or non-volatile solvent may be added—as, for instance, turpentine, alcohol, or paraffin-oil.

I have found in using the heavy metallic compounds in combination with an organic reducing vehicle that the physical state of the metallic salt influences its fluxing properties to a considerable extent. Where the salt is used in a coarse condition, its covering power is poor and the solder does not always flow freely. Further, where occasion requires the soldering of a lap-seam, lock-joint, or similar work, where the pieces of aluminium are already closely fitted into place, it is difficult to work the flux into the joint.

I have found that if the flux contains the metallic salt in an extremely fine state of division it becomes much more penetrating and causes the solder to flow very freely and to unite with the surface in every part.

In carrying out my invention I prefer to prepare the metallic salt in a fine state of subdivision and suitably in the following manner: First, precipitation of the salt from very dilute solutions in a light flocculent condition; second, trituration of the precipitated salt with the organic compound in a most thorough manner.

The formation and precipitation of the salt is preferably brought about by metathetical reaction. When the metallic salt desired is soluble in water, menstruum—as, for instance, alcohol—in which the resulting salt is insoluble, may be used.

As an example the following will serve: If silver chlorid be the salt desired, proceed as follows: One hundred grams nitrate of silver are dissolved in eight liters of water and precipitated in the cold by the requisite amount of hydrochloric acid or by a soluble chlorid. The precipitate is well washed, and dried, preferably, at about 45° centigrade. The wet precipitate may be mixed with the organic compound without drying; but the flux made in this manner does not afford as good results. It is then ground with the organic body and alkali-haloid in a porcelain ball-mill for twenty-four hours, when the compound is ready for use as a flux. Such a flux answers all requirements. It admits of soldering seams made by folding the metal, cracks in aluminium castings, and other work which has hitherto proven difficult with the salts as ordinarily found in commerce. The treated metallic salt is also more easily reduced and has greater covering power; hence is not only more effective, but is more economical to use than the unprepared salt.

Employing the finely-divided salt it has been found that one part metallic salt to ten parts of organic matter was just as effective as one part untreated salt to two parts of organic matter.

As the organic matter which may be employed is comparatively inexpensive, a cheapening in the cost of the flux results by the use of the salt treated as herein described.

My present invention of a flux for soldering aluminium therefore consists of the combination of the three following classes of bodies:

1. A thermoplating compound—i. e., a finely-divided metallic salt—whose heat of formation is less than that of the corresponding salt of aluminium.

2. A detergent or alumina-dissolving compound embracing salts whose heat of formation is greater than the corresponding salt of aluminium, especially designated being the halogen salts of the alkalies.

3. An organic body whose carbon or hydrogen at elevated temperatures is capable of acting reducingly on the metallic salt in class 1.

In selecting from these classes the individuals of greatest efficiency the following considerations obtain:

In class 1 the thermoplating compound is usually the more efficient the greater the difference between its heat of formation and that of the corresponding salt of aluminium.

In class 2 the greater the heat of formation of the alumina solvent the more marked generally is its action.

In class 3 the organic body should be capable at high temperatures of acting reducingly on the compounds comprised by class 1. For the sake of cheapness it may be an oil stock or a wax.

What I claim as my invention is—

Flux for soldering aluminium consisting of a heavy metal salt whose heat of formation is less than the corresponding salt of aluminium, a saline body whose heat of formation is greater than the corresponding salt of aluminium and an organic body.

In testimony whereof I have affixed my signature in presence of two witnesses.

CARLETON ELLIS.

Witnesses:
FREDERIC G. CHISHOLM,
MAJOR WILLIAM BARBER.